United States Patent [19]

Voit et al.

[11] Patent Number: 5,754,641
[45] Date of Patent: May 19, 1998

[54] METHOD OF SCREENING OUTGOING CALLS VIA A VIDEO DISPLAY

[75] Inventors: Eric A. Voit, Baltimore; Larry W. Sours, Crofton; Lance S. Liptak, Laytonsville, all of Md.; Kenneth E. DePaul, Wake Forest, N.C.

[73] Assignee: Bell Atlantic Network Services, Inc., Arlington, Va.

[21] Appl. No.: 564,960

[22] Filed: Nov. 30, 1995

[51] Int. Cl.$^6$ .................................................. H04M 3/42
[52] U.S. Cl. .................. 379/354; 379/201; 379/207; 379/220; 370/401
[58] Field of Search ........................... 379/201, 196, 379/207, 211, 219, 105, 220, 246, 221, 230, 142, 354; 370/396, 397, 401, 404

[56] References Cited

U.S. PATENT DOCUMENTS

| | | | |
|---|---|---|---|
| 4,763,191 | 8/1988 | Gordon et al. | 379/246 |
| 5,262,860 | 11/1993 | Fitzpatrick et al. | 379/354 |
| 5,278,889 | 1/1994 | Papanicolaou et al. | 379/230 |
| 5,349,638 | 9/1994 | Pitroda et al. | |
| 5,541,917 | 7/1996 | Farris | 379/105 |
| 5,563,939 | 10/1996 | La Porta et al. | |
| 5,566,232 | 10/1996 | Sizer, II | |
| 5,570,295 | 10/1996 | Isenerg et al. | |
| 5,583,864 | 12/1996 | Lightfoot et al. | 379/201 |
| 5,583,920 | 12/1996 | Wheeler, Jr. | 379/96 |
| 5,592,477 | 1/1997 | Farris et al. | 370/396 |
| 5,621,728 | 4/1997 | Lightfoot et al. | 370/397 |
| 5,623,491 | 4/1997 | Skoog | 370/404 |
| 5,629,978 | 5/1997 | Blumhardt et al. | 379/207 |

FOREIGN PATENT DOCUMENTS

WO93/01685  1/1993  WIPO.

OTHER PUBLICATIONS

Berman et al, "Perspectives on the AIN Architecture", IEEE Communications Magazine, Feb. 1992, pp. 27–32.
"The SPACE system: A new dimension in service creation", Bellcore Exchange, Jan./Feb. 1992, pp. 8–13.
"Turning concepts into reality with the SPACE system", Bellcore Exchange, May/Jun. 1992, pp. 25–28.
"An Introduction to Bellcore's Integrated Service Control Point Software", Bellcore, 1992, pp. 1–8.

*Primary Examiner*—Krista Zele
*Assistant Examiner*—Scott Wolinsky
*Attorney, Agent, or Firm*—Lowe, Price, LeBlanc & Becker

[57] ABSTRACT

A communications network system having an advanced intelligent network (AIN) controlling the system provides narrowband and broadband communications to customer premises. The system includes a narrowband network for narrowband communications including at least one signal switching office and a signal system. The signal switching office routes narrowband calls and detects an outgoing narrowband call from a customer at a customer premises and also detects dialed digits corresponding to such outgoing narrowband call. A broadband network for broadband communications is connected to video equipment at the customer premises. The video equipment includes a video display and is connected to the broadband network via an addressable settop box. A services control point in the advanced intelligent network is operative to perform network service logic programs for routing narrowband communications in the narrowband network. At least one of the network service logic programs is responsive to a query from the at least one signal switching office resulting from detecting the outgoing narrowband call and also detecting the dialed digits corresponding to that call. The service logic program instructs the services control point to initiate a data transaction to send data to the broadband network. The data includes the dialed digits. The dialed digits are displayed on the video equipment and request a response from the customer. The customer responds and instructs the narrowband switch as to whether or not to complete the outgoing call.

33 Claims, 7 Drawing Sheets

METHOD OF SCREENING OUTGOING CALLS VIA A VIDEO DISPLAY

FIELD OF THE INVENTION

This invention relates generally to the processing of narrowband and broadband communications in an advanced intelligent network (AIN). In particular, the present invention relates to the use of a services control point for coordinating and integrating narrowband and broadband operations carried out within the AIN.

BACKGROUND OF THE INVENTION

Enhanced telephone networks, frequently referred to as advanced intelligent networks (AIN), provide network operators with considerable flexibility and economy in structuring their product offerings and providing their customers with numerous telephone conveniences and services. The typical AIN architecture allows switching offices of the transport network to interact with data base systems and other peripherals through an interoffice signaling network, to obtain information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call. AIN databases are typically accessed via a common channel signaling system—a separate network used for out-of-band signaling.

This architectural scheme is the basis for a diversity of network services. AIN techniques are employed by both interexchange and local exchange carriers. For some applications, the attendant common channel signaling systems of multiple carriers have been interconnected so that signaling information can be exchanged for coordinating operations in support of certain telephone services involving both carriers. For example, an interexchange carrier's common channel signaling system and that of a local exchange carrier may be interconnected through a signal transfer point so that signals can be exchanged relative to special service telephone calls involving both carriers, examples of which are such things as "800" calls and calling card calls where number verification is needed.

In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to a services control point which includes a Multi-Services Application Platform (MSAP) database.

The services control point is essentially a central control for the network. If needed, it can instruct the central office to obtain and forward additional information. Once sufficient information about the call has reached the services control point, it accesses its stored data tables in the MSAP database to translate the received message data into a call control message and returns the call control message to the office of the network via CCIS link. The network offices then use the call control message to complete the particular call.

AIN networks were developed to meet the functional needs associated with the provision of voiceband telecommunications services. See, for example, Berman et al., "Perspectives on the AIN Architecture," IEEE Communications Magazine, February 1992, pp.27–32. No provision was made for broadband communications, such as video dialtone, in these networks and consequently, the ISCP and each of the other elements in the network is a narrowband element used for narrowband services, such as voice communications. Furthermore, even if broadband communications are available in an AIN, the enhanced services implemented by the services control point can not be implemented for the broadband communications.

Concomitant with the advances in AIN technology, significant advances have also been made in the customer premise equipment (CPE)—that apparatus which makes up the terminus equipment between which telecommunications calls are extended through the carrier networks. While CPE may be no more than a simple telephone, it also may be quite complex and include such things as computers interconnected by local area networks (LANs), and other intricate arrangements of terminal equipment and peripheral devices (e.g., facsimile machines, video terminals, databases, and so forth). In particular, the make-up of CPE is becoming more oriented towards broadband communications, such as video services. The composition of CPE used in a typical residential setting, for example, is changing rapidly as computers are increasingly used in the home, and as such things as video, information, and interactive broadband services "on demand" begin to become commercial realities.

Although the advances in intelligent networking and customer premise equipment have together resulted in a very effective telecommunications system, the advances on the two sides have been made somewhat independently and not always with a view as to how the operations of each might be coordinated and integrated with the other for even more effective communications. Known networks make little use of the additional broadband capabilities of modern customer premises equipment.

On the network side, the AIN operations are usually carried out entirely within the boundaries of the network. A telephone call, for example, receives AIN treatment only after it enters the network (the "network" takes diverse forms, of course). Typically, the CPE, whatever its make-up, simply directs a call to the network or receives a call from the AIN network, and only there does it receive whatever AIN treatment it may provoke within the network.

Thus, there is a need for better coordination between the AIN narrowband network and the broadband video network, including broadband CPE, so that, for any particular service, operations in support of the telecommunications exchanged are carried out in a more seamless and integrated fashion. Preferably, such multi-network integration would offer services which the customer perceives to span the narrowband and broadband video networks, including real-time multi-network call processing interactive services.

In particular, known methods of screening outgoing telephone calls are either carried out entirely within the telephone network after the call has left the customer premises or by a special device within the CPE. There are customer premises devices which will monitor outgoing calls. In those devices, everything going to the network has to go through the device, and the device monitors for certain calls, such as 976 calls, etc. If a 976 call is dialed, it is cut off right at the device.

There are also custom dial plan (CDP) triggers that facilitate a similar outgoing call screening function from the services control point. These triggers allow certain sets of digits to be screened and cause a switch to trigger queries to the ISCP only in response to certain sets of dialed digits. They are tunable in the switch to determine what will cause a trigger. However, it is difficult to quickly and accurately change the calls that will be passed through. An example of an outgoing call service is discussed in "The SPACE system: A new dimension in service creation", Bellcore Exchange, January/February 1992, pp. 8–13.

More specifically, there is a need for techniques that will allow the services control point to look to a subscriber's CPE, particularly broadband equipment, such as a settop box, for information used for controlling and routing both narrowband and broadband communications. In particular, there is a need for a technique of using broadband CPE to monitor and screen outgoing calls in real time with an easily controlled visual interface.

BRIEF SUMMARY OF THE INVENTION

It is an object of the present invention to provide methods and apparatus which will overcome the disadvantages and meet the needs discussed above.

It is also an object of the present invention to coordinate and integrate narrowband and broadband operation s carried out in an AIN network.

It is a further object of the invention to provide for coordination and control of narrowband and broadband communications in an AIN network by using a services control point having one or more interfaces to elements of a broadband network.

It is an object of the present invention to provide an AIN architecture which permits a services control point to interact with a customer's broadband customer premises equipment in order to screen a telephone call originating from the customer's narrowband equipment.

It is also an object of the present invention to provide an AIN network architecture which allows a customer's broadband customer premises equipment to transmit information to an AIN telephone network, particularly so that the services control point can provide instructions to the narrowband network.

It is a further object of the present invention to provide an AIN network architecture which offers integration of narrowband and broadband services, wherein the narrowband switch queries the services control point in response to a telephone call, and the services control point interacts with a subscriber via the subscriber's broadband set-top terminal device prior to instructing the narrowband switch as to how to complete the call.

The present invention is based upon a realization that numerous advantages would be gained by more closely integrating the services control point of the narrowband AIN telephone network and broadband customer premises equipment, particularly for purposes of controlling routing of telephone services from the customer premises. Signalling messages are exchanged between the broadband customer premises equipment and the services control point to coordinate and integrate operations of the two networks, e.g., to exchange service programming information or to exchange line status information. The services control point has at least one signaling interface between the broadband customer premises equipment and the signaling network of the public switched telephone network and can interact with broadband customer premises equipment, provide service logic for the customer premises equipment and control communications from the customer's on-premises equipment. The interactive functionality of the services control point may be implemented by hardware, by software or by some combination of the two.

A preferred embodiment of the invention utilizes a unique method of screening outgoing phone calls from a customer via an interactive control channel connected to the customer's television set in a broadband network architecture. The method allows a customer watching the television to be informed (e.g., via a message on the bottom of their screen) of the telephone number of an outgoing call being made from an extension within the customer's house. If the call is a 900, 976, international, long distance, and/or toll call and if the customer does not want the call to be made, the customer can make an appropriate selection on the remote control of their settop box to terminate the call before it leaves the originating switch.

Data and signaling links are used to commonly access an integrated services control point (ISCP) and an "off hook delay" trigger is set in the originating switch which sends a TCAP query to the ISCP before calls are forwarded to the network. When the ISCP receives the query, it issues a send data transaction with the dialed digits to an element within the broadband video network, preferably directly to the customer's settop box. The dialed digits are displayed on the customer's television set along with a prompt soliciting some action from the customer's broadband equipment in order for the call processing operations to be continued. The prompt is preferably directed directly to a broadband element within the CPE, such as a settop box, or through some other equipment located elsewhere within the broadband network.

The settop box has access to a data channel which allows it to respond. After the dialed digits are displayed on the television set, the customer makes selections using the remote control of the settop box. The customer can, for example, press "1", to allow a call to go through and press "2" to block a call from being made. Thus, calls do not proceed without the appropriate authorization from the settop box. The settop box can interact with the ISCP in any one of a variety of manners. The ISCP may provide service logic for the CPE, and the interactive functionality of the ISCP may be implemented by hardware, by software or by some combination of the two. Default service logic for routing the call can be prestored in the ISCP in situations where no response is received.

The invention integrates narrowband services and video dialtone type services of video dialtone type networks merely by leveraging existing investments for a common set of services without having to rebuild the existing infrastructure for narrowband signaling in an environment where the ISCP is fully integrated with the video and other broadband architectures. Since the ISCP is transport independent, the invention is applicable to any video architecture, including, for example, hybrid fiber coax, switch digital video network, digital MMDS, or ADSL. For example, digital MMDS has a very different transport architecture from a switched digital video network or a hybrid fiber coax network. But the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there can be fast implementation into existing architectures using switches and live ISCPs.

An interface to the ISCP and/or other databases of the public network may also be provided through software and/or terminal devices maintained on the customer's premises. The software may run on a separate terminal device, such as a set-top box used for video services, or on a suitably programmed personal computer (PC).

With an AIN architecture employed having both broadband and narrowband networks, the signaling systems of the two are tied together through interfaces to the ISCP that permit the exchange of ancillary signaling messages. Extension of the signaling network and AIN signaling and routing control functionality into the broadband network facilitates AIN type routing using information on the status of the broadband CPE and user selections received from the broadband CPE. For example, the ISCP would inquire via the CCIS link as to whether or not a broadband terminal device corresponding to an outgoing telephone call was in use. Similarly, the customer premises equipment could query the public network via the ISCP interface as to aspects, such as cost, of the outgoing call. The customer premises equipment would connect the call to the public narrowband network for actual routing only upon learning that it was allowed under subscriber determined criteria.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
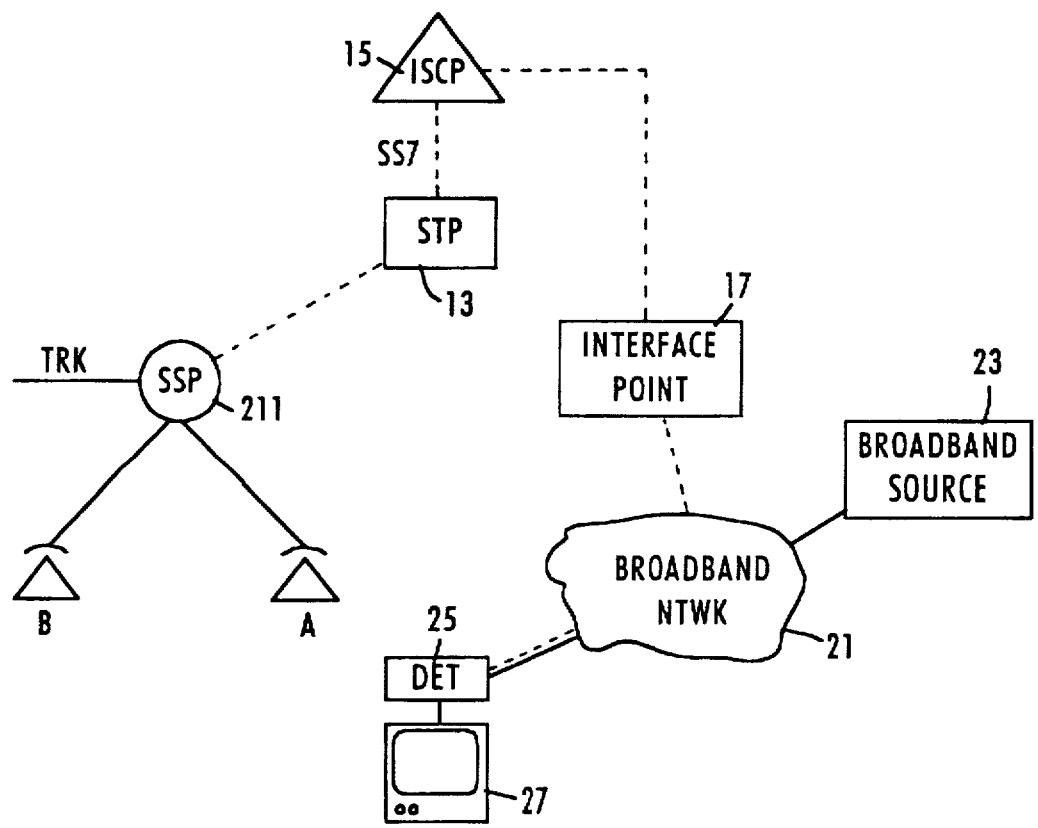
FIG. 1 is a schematic block diagram of an example of an advanced intelligent network architecture providing for ISCP control of narrowband and broadband communications.

FIG. 1 is a schematic block diagram of a generic AIN network utilizing ISCP control of narrowband and broadband communications. The customer premises equipment (CPE) of a first customer, customer A, contains a standard telephone and a television or video display 27 which receives video signals through a settop box. In the example shown in FIG. 1, the settop box is a digital entertainment terminal (DET) 25. DET 25 has a data channel and a signaling channel connected to broadband network 21. The details of an exemplary DET can be found in commonly assigned copending U.S. patent application Ser. No. 08/380, 755 filed on Jan. 31, 1995 and entitled "Digital Entertainment Terminal with Channel Mapping" or commonly assigned copending U.S. patent application Ser. No. 08/498, 265 filed on Jul. 3, 1995 and issues as U.S. Pat. No. 5,666,293 on Sep. 9, 1997 entitled "Downloading Operating System Software through a Broadcast Channel", both of which are hereby incorporated by reference in their entirety.

Although a single broadband source 23 is shown in FIG. 1, the broadband network may have any number of connected sources and end users. Although shown as delivering video information through DET 25, the broadband network may deliver any type of, or any number of types of, broadband information. For example, the broadband network 21 could also transmit digital multimedia information, and the customer premises equipment could include a personal computer and computer monitor instead of, or in addition to, DET 25 and television 27. A Power PC is preferred so that the personal computer may easily match up with the standard settop boxes. It should also be understood that the broadband network may be of any architecture, using any currently existing or later developed technology.

The broadband network 21 is connected to a services control point through an interface point 17. In the preferred embodiment of the invention, the services control point is BellCore's Integrated Service Control Point (ISCP) Software system as generally discussed in a 1992 document entitled "An Introduction to Bellcore's Integrated Service Control Point Software" or a revised version thereof, such as Release 2.2. The signaling interface protocol and connection with ISCP 15 may be of any currently existing or later developed signaling interface used in Bellcore's TEL-EGATE software products or elsewhere. See, for example, "Turning concepts into reality with the SPACE system", Bellcore Exchange, May/June 1992, pp. 25–28. Specific ISCP to broadband network signaling interfaces are also discussed below with respect to FIGS. 4–8. The ISCP 15 also has an SS7 signaling connection to a signal transferring point (STP) 13. A signal switching point (SSP) 11 provides narrowband switching for a large number of connected telephone customers, represented here by terminals A & B. Customer A may be connected to broadband network 21, and may accept narrowband information over a trunk line(s) connected to, for example, other SSPs.

Although shown as separate elements in FIG. 1, it should be understood that there may be some physical or virtual connection or relationship between the narrowband network including SSP 11 and STP 13 and broadband network 21. For example, broadband network 21 could receive broadband source information from SSP 11 through a T1 line or other broadband connection, or the DET 25 of customer A could be connected to and receive video information over the same telephone line from SSP 11 providing standard telephone service.

Figure 3:
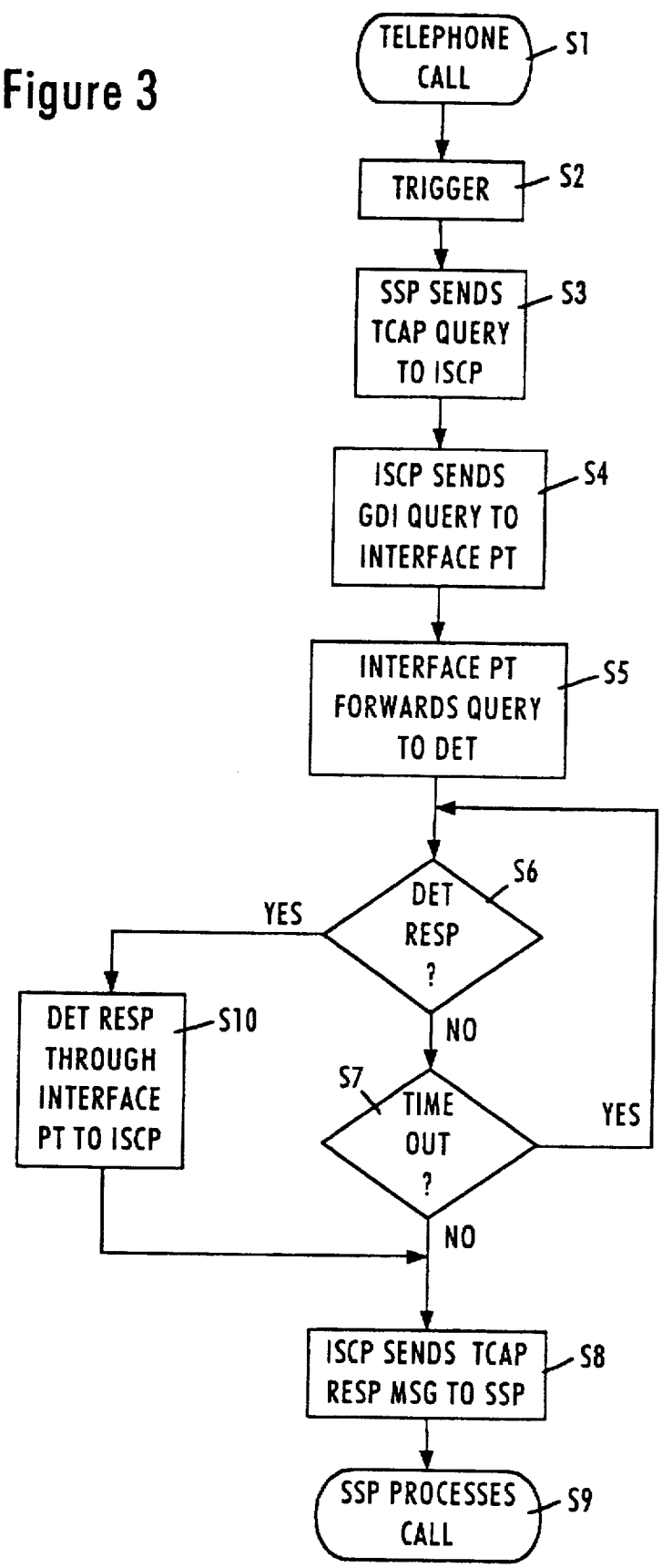
FIG. 3 is a flowchart useful in explaining a method of carrying out the ISCP interactions between narrowband call processing and a broadband network in the generic architecture of Fig.1.

The architecture shown in FIG. 1 can provide video services in any number of ways of which the method shown in FIG. 3 is but one example. A trigger is set in the customer profile information stored in SSP 11 with respect to the narrowband line of customer A. The trigger may relate to any one of a variety of call processing conditions. As a simple example, assume that SSP 11 contains an off hook delay trigger which is activated whenever phone A is attempting to make a telephone call (Step S1) from a telephone extension within the premises of customer A. When SSP 11 detects a trigger (S2) in response to the attempted telephone call, the SSP 11 composes and sends the dialed digits up to ISCP 15 (Step S3) before the telephone call proceeds any further than the phone line of customer A.

The off hook delay trigger detected in Step S2 is independent from the video service. It may be set on all lines or stations, or only on the ones of customers that have the video service, or only on the ones of customers that buy an video service with screening of outgoing calls. To avoid unnecessary signaling network traffic, the trigger is preferably set only on the lines of customers that buy the video service with screening of outgoing calls. The trigger may be set and left on or it may be set by the switch when the customer sets up his video service, for example, to watch a movie.

The preferred approach is to leave the trigger on all the time; and either the ISCP 15 is informed as to whether somebody is watching a movie through the DET 24 or the ISCP 15 asks the Level 1 gateway or other element whether the DET is active. The ISCP 15 preferably uses the TEL-EGATE getData/sendData Interface (GDI), described in Issue 1 of the Bellcore specifications released on May 25, 1993, which is a generic interface for getting and sending data between TELEGATE (and/or other) systems. The data interface is used to send a packet down to interface point 17 that says "send data" to find out the current status (Step S4). Then interface point 17 forwards the query to DET 25 through the broadband network 21 (Step S5). The ISCP 15 then waits to receive a response from the DET 25 through the interface point (Step S10). The DET or other broadband terminating device of the CPE then quickly returns an automated response. The query and response may be very simple, such as whether or not a video event is in progress. Depending upon the response, the ISCP SSP TCAP message to the SSP (Step 8), and the SSP processes the call (Step 9).

Alternatively, the DET may format the query into a textual or other type of message of the dialed digits and display it at the bottom of the screen on TV 27 before the phone call is placed. In this later case, the customer then enters a selection into the DET 25 which is forwarded to the ISCP 15 through broadband network 21 and the interface point 17. The selection indicates the customer's preferred disposition of that call.

The status query may be unanswered if the CPE is not on (Step S6) or a certain pre-designated or programmed time period elapses before a response is received (Step S7). The GDI protocol interface process can time out at, e.g., 2, 5, 10, or 15 seconds, so that the narrowband call processing might have a default where the call will be terminated or it will just proceed and ring on the regular telephone. The ISCP can be custom programmed with default service logic for each customer. The ISCP, for example, could route none or only local telephone calls in the normal manner. As a further alternative, the ISCP could store information regarding each call without a positive response from the DET and give an indication to the customer premises equipment by a signaling message displayed across the TV screen the next time the user turns on the DET 25 indicating that at least one outgoing phone call was attempted. The information related to the series of phone calls could be stored in the DET or stored elsewhere with a message sent to the DET indicating that when it is turned on it should retrieve the list. DET 25 may be of a type that is not up and running all the time so long as the signal reception equipment is always running while the DET is in the power-down state.

Figure 4:
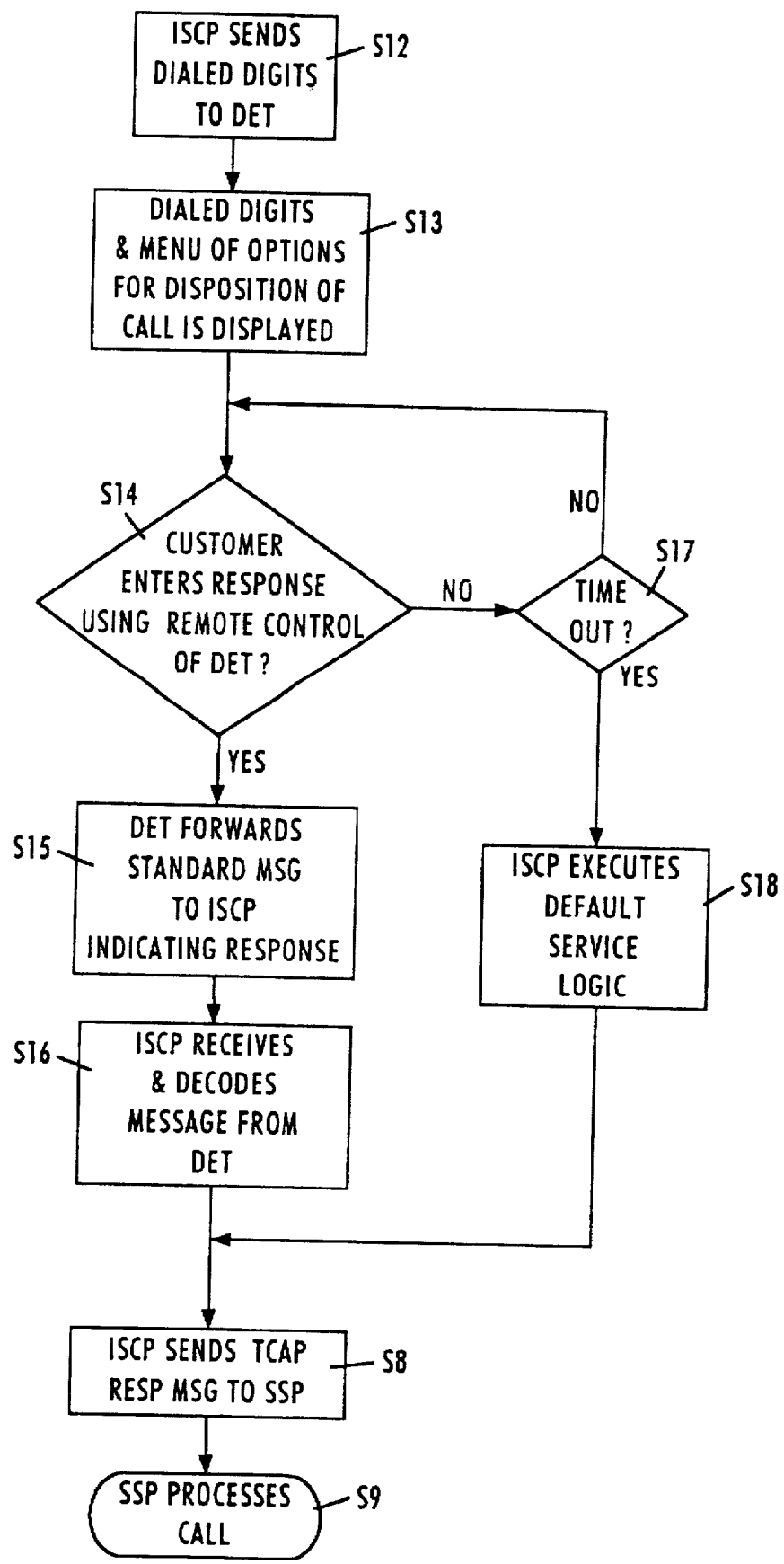
FIG. 4 is a flowchart depicting major aspects of a method of screening outgoing calls in a preferred embodiment of the invention.

FIG. 4 shows major aspects of a method of screening outgoing calls on a television according to a first embodiment of the invention. The method actually starts out with steps S1 to S7 and S10 of the general method shown in FIG. 3, and for convenience, those steps are not shown again in FIG. 4. Then, the ISCP sends the dialed digits to the settop box of customer A, identified through the use of stored internal data, (Step S12) and the digits, along with a prompt, are displayed on the television screen (Step S13). The DET preferably formats the dialed digits into a textual message and displays the message as an overlay along the bottom of the video shown on the screen on TV 27. In addition, the DET also displays a prompt to the customer and a menu of options for screening the outgoing call. The menu may be a standard menu containing the options of blocking the call and allowing it to pass through. The menu may also include any number of options which are custom-defined for each user and stored in their respective DET.

As shown, the customer then enters a response, using a remote control of the settop box, indicating the desired disposition of the call (Step S14). The response may be a simple selection of a displayed option (for example, press "1" to block the call). The DET sends a message representative of the user selection to the ISCP so that the call can be completed in accordance with the user selection (Step S15). The manner of interaction between the DET and the customer is not limited and may take any form implementable by the settop box and the particular broadband video network, including each customer's broadband video equipment. However, the message forwarded from DET 25 to the ISCP 15 through broadband network 21 and the interface point 17 is in compliance with a standard message set and is decoded by the ISCP to determine the customer's preferred disposition of that call (Step S16).

If, however, a response is not received from the user within a predetermined period of time a "time-out" occurs similar to that described above with respect to FIG. 3 (Step S17) and the ISCP executes default service logic in order to determine the disposition of the call (Step S18). The default service logic may simply complete or block all calls in the normal manner or it may complete only certain calls, such as local or 911 calls.

In an alternative not shown in FIG. 4, the DET (or ISCP) may contain and execute a program containing instructions which instruct the DET to transmit information to the ISCP so that the ISCP can, in response, provide instructions to the narrowband network for matters other than the blocking of the narrowband call corresponding to the dialed digits displayed on the television in step S8. The program could, for example, set the amount of time that the dialed digits are displayed on the television before the narrowband call is connected.

The off hook delay trigger used in the method shown in FIG. 3 allows the switch to continue to be part of the processing of the call during the interaction of the user. The length of delay in completing the above steps depends on how the interfacing is set. Of course, the ISCP will time out interacting with the DET at the predefined interval in step S7 if a response is not received back from the user. There is also a time out value between the ISCP and the narrowband switch. The times on each interface are flexible and can be changed and modified based on user requirements or service requirements.

There may be other originating triggers set in the central office serving the customer's telephone, so that a query is sent and a text message forwarded down for display on the TV set. The TV user enters a response to indicate their desired processing of the call, and the ISCP sends a message to the switch accordingly. Any configuration of the basic architecture shown in FIG. 1 is possible and the broadband network architecture is interchangeable as long as the elements of the broadband network can accept a GDI message or other standard interface message and respond with information based on what the customer inputs through the remote control of the DET.

The ISCP can integrate various networks, such as the cellular network and the wireline network for PCS service. The ISCP has an interface to IS 41 cellular-type signaling as well as the AIN 0.1 message sets for narrowband signaling. The capability of integrating those two different message sets creates cross network services. Some services could be performed by using an integrated broadband cellular wireline switch, but putting the service logic in the ISCP makes it easy.

Since the ISCP is transport independent, the invention is applicable to any video architecture, including, for example, hybrid fiber coax, switched digital video network, MMDS, or ADSL. MMDS has a very different transport architecture than a switched digital video network or a hybrid fiber coax network. However, the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there is fast implementation into existing architectures using switches and live ISCPs.

Figure 2:
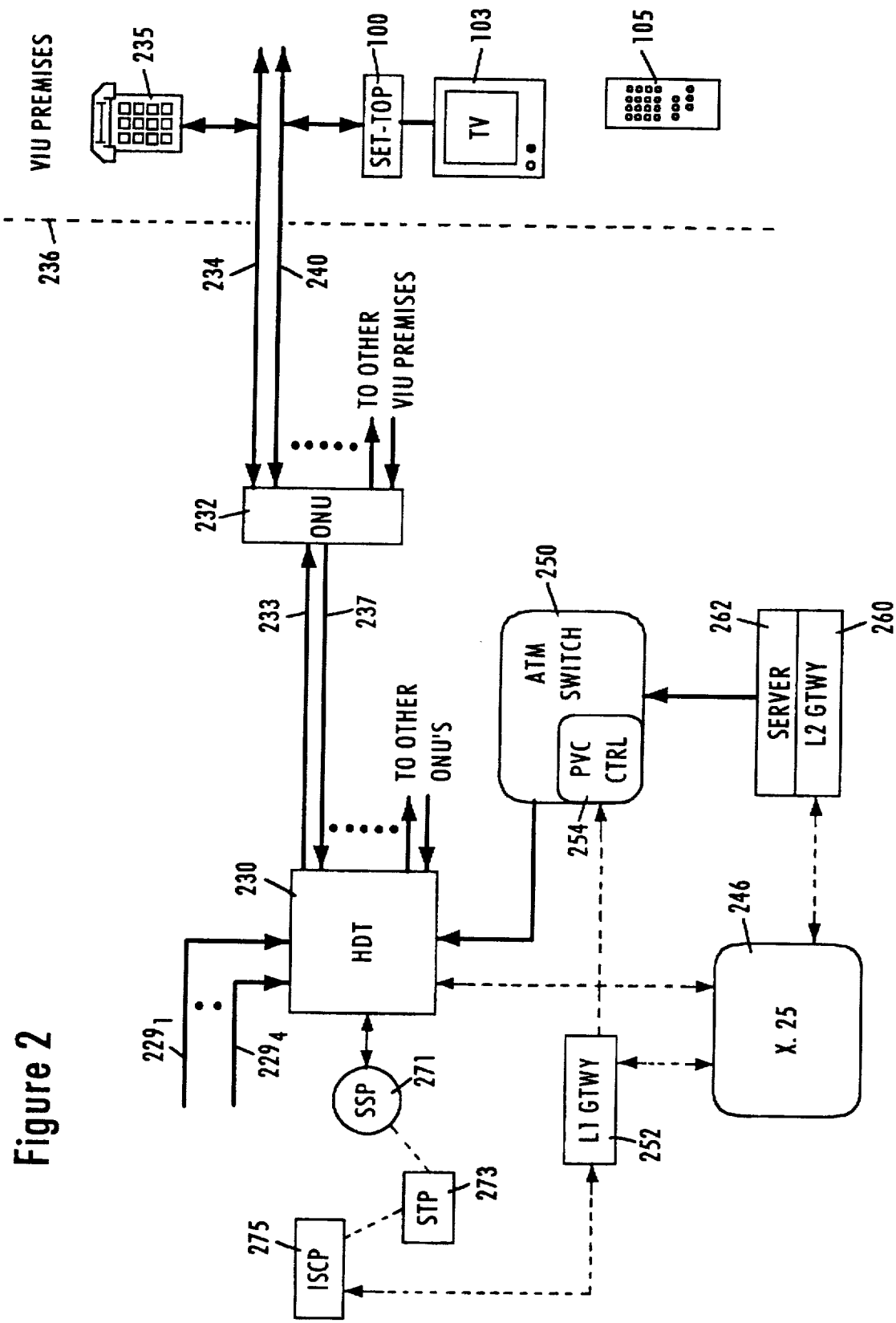
FIG. 2 is an illustration of an exemplary implementation of the invention in a full service network providing broadband video service and having a set-top terminal for interacting with the ISCP of the AIN network.

FIG. 2 illustrates a preferred architecture for a full service network providing transport for broadband services, including broadcast video and IMTV type services such as video on demand, and implementing ISCP capabilities for the broadband services such as the method described above. A TV set is shown at 103 having a remote control 105.

An ATM backbone network includes four optical fibers $229_1$ to $229_4$ carrying broadcast programming from an ATM edge device (not shown) to a large number of host digital terminals (HDT's) 230 (only one of which is shown in FIG. 2). The ATM edge device may comprise a relatively small capacity ATM switch. A more detailed description of the ATM edge device and its operation is disclosed in commonly assigned U.S. patent application Ser. No. 08/380,744 filed Jan. 31, 1995 entitled "Full Service Network Using Asynchronous Transfer Mode Multiplexing" which issued as U.S Pat. No. 5,583,863 on Dec. 10, 1996, the disclosure of which is incorporated herein in its entirety by reference. Each optical fiber 229 carries 16 bit interleaved DS3 rate bit streams. Each DS3 rate stream contains 6 time division multiplexed ATM virtual circuits. Each virtual circuit carries 6 Mbits/s of digitized and compressed programming, e.g. encoded in MPEG II form and adapted for ATM cell transport.

The ATM backbone network includes at least one ATM switch 250 controlled by a PVC controller 254. A subscriber wishing to initiate an interactive broadband communication session interacts with a level 1 gateway 252 which in turn communicates with the PVC controller 254 to obtain the requisite bandwidth through the switch 250.

Each video information user (VIU) premises 236 is pre-assigned three DS3 slots on the downstream fiber from the HDT 230 to the ONU 232 for broadband service. Each home or living unit 236 is preferably allocated a capacity of four set-top terminal devices 100, with three being active at any one time. A coaxial drop 240 for each premises 236 carries 180 Mbits/s baseband digital data, which will simultaneously transport three 45 Mbits/s DS3 bit streams. For a particular VIU premises 236, the three DS3 channels on the fiber from the HDT 230 to the ONU 232 and on the drop cable 240 are individually assignable to different set-tops 100 within the subscriber's premises 236. The HDT 230 performs a switching type functionality to route a DS3 carrying a selected program from the fibers 229 or the fiber from the ATM switch 250 to each DS3 on the downstream fiber 233 assigned to a set-top 100. The ONU 232 performs optical to electrical conversion, separates out the DS3's received over the downstream optical fiber 233 from the HDT 230 and supplies the selected DS3 bit streams to appropriate channels on the coaxial cables 240 going to the respective subscriber premises 236.

The local loop network consists of the HDT 230, two-way optical fiber pairs between the HDT 230 and optical network units 232 (ONU's), and coaxial cables 240 and twisted wire pairs 234 connecting the ONU's to the subscriber premises equipment. In addition to broadband, the network illustrated in FIG. 2 will also provide narrowband transport for voice and narrowband data services. A digital switch or an analog implementation of an SSP switch 271 provides standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HDT's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and to demultiplex signals received over the other fiber of the fiber pair. The fiber pairs between the HDT 230 and the ONU's 232 will also have a number of DS1 channels to carry telephone and narrowband data signals to and from the subscriber3 s premises. In addition to the video services discussed above, the ONU 232 will provide telephone signals and appropriate power to the subscriber's premises over the twisted wire pairs 234 connected to subscriber's telephone sets 235.

Signaling communications between the set top 100 and the serving HDT 230 utilize a consumer electronics (CE) bus protocol. In the presently preferred embodiment, signaling communications between the other nodes of the network ride on an X.25 packet switched data network 246. In future implementations, instead of data network 246, the ATM switch 250 will carry the signaling traffic together with the IMTV broadband traffic.

In the illustrated embodiment, the downstream optical fiber from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

For narrowband signaling information, the ONU 232 passes all of the downstream signaling data received from the HDT 230 on fiber 233 through to all of the coaxial drop cables 240, so that for signaling data the cables look like a common bus shared by all of the connected set-tops. In the downstream direction, signaling packets are interleaved with the ATM cell stream packets. In the upstream direction, the signaling channel on the coaxial cable 240 is in a different frequency portion of the spectrum from the downstream DS3 transmissions. The ONU combines all of the upstream signaling packets from subscriber drop cables 240 into a digital data stream and transmits that data stream together with digitized upstream telephone service signals over the upstream fiber 237 to the HDT 230.

Each set-top 100 comprises a DET and a network interface module (NIM). In this embodiment, the NIM connects to the coaxial drop cable 240 to send control signals to the ONU 232 and receive video and data signals from the ONU 232. The NIM includes means to selectively demodulate received data from an assigned one of the three DS3 slots on the coax cable 240 and an ATM demux for mapping ATM cells from one ATM virtual circuit in that DS3back into the corresponding MPEG packets. Specifically, the ATM demux captures and processes ATM cells bearing specified VPI/VCI header information corresponding to the selected program channel from the DS3 stream.

Each set-top 100 includes means to receive selection signals from a user via remote control, and as noted above, the set-top responds by transmitting appropriate data signals over a narrowband signaling channel on the coaxial drop cable to the ONU 232. According to the preferred embodiment, the narrowband signaling channel uses X.25 or a consumer electronics (CE) bus protocol. With the CE bus protocol, for example, the active set-tops 100 are assigned signaling time slots by the HDT 230, and each active set-top 100 transmits channel selection data upstream to the ONU 232 in its assigned slot.

The ONU 232 multiplexes the data signals from the set-tops it services together and transmits those signals to the HDT 230 over an upstream channel on an optical fiber. If the data represents selection signals, the HDT responds to that data as outlined above, and stores data identifying each subscriber's selections for subsequent periodic uploading through a first X.25 packet data communication network 246.

In operation, each time a subscriber turns on a set-top 100, the set-top transmits an appropriate signaling message upstream to the HDT 230. The HDT stores a table of valid equipment ID's for the set-tops it services. The signaling message transmitted to the HDT 230 at turn-on includes the equipment ID for the particular set-top 100. When the HDT 230 receives the initial signaling message from the set-top, the HDT executes a routine to initialize the set-top. As part of this initialization routine, the HDT 230 validates the set-top equipment ID and assigns one of the DS3 slots on the downstream fiber 233 to the ONU 232 to that set-top for as long as that set-top remains on. Also, one of the DS3's on the subscriber's coaxial drop cable 240 from the ONU 232 is assigned to the set-top 100 for the duration of communications.

At the same time, the HDT 230 will complete a two-way signaling communication link with the DET in the particular set-top 100. At least on the coaxial cable portion, the packets relating to the signaling link are identified by header information identifying the particular link, i.e. a signaling identifier assigned to this communication between the HDT 230 and the particular set-top 100. As part of the initialization routine, the HDT 230 sends one or more signaling messages to the DET in set-top 100 identifying the signaling channel assignment and the DS3 assignment. Specifically, for the signaling link, the HDT 230 assigns the next idle signaling ID to this call and informs the DET of that signaling ID assignment. The HDT 230 addresses downstream control messages to the set-top using the assigned signaling call ID. When queried, the subscriber's set-top 100 provides an appropriate "off-hook" signal to the HDT 230. The HDT 230 sends the message through the X.25 packet switched network 246 to the Level 1 Gateway (L1 GTWY) 252. Once the initial message is accepted, an X.25 signalling link is provided between the HDT 230 and the Level 1 Gateway 252 for purposes of carrying signaling information between the set-top 100 and the Gateway, and the HDT 230 internally associates that signaling call with the signaling call over the fibers 233, 237 and the coaxial cable 240, i.e. the signaling link set up from the HDT 230 through the ONU 232 to the set-top 100 when the user turned on the set-top terminal.

The set-top 100 may also send an initiation or 'hello' message to the Level 1 Gateway 252 that includes basic information including the set-top ID and a set-top type designation. The Level 1 Gateway 252 interacts with the subscriber through the set-top 100 to obtain a selection in response to a query. The Level 1 Gateway 252 receives a selection input from the set-top 100, e.g. in response to a menu display, within a predetermined period following the menu transmission. If the Level 1 Gateway 252 receives the selection input message from the set-top 100 within the predetermined period, the Level 1 Gateway 252 translates that message accordingly. The Level 1 Gateway 252 may act on the response, e.g. to set up an interactive session through the ATM switch 250 to a VIP's server 262 and through data network 246 to the VIP's level 2 gateway 260. Under certain circumstances, the gateway 252 forwards the message to ISCP 275 for processing in accord with the present invention. The ISCP 272 is linked to STP 272 and SSP 271 in a conventional manner.

During broadband communications, the set-top 100 can transmit control signalling upstream through the ONU 232, the HDT 230, the X.25 data network and the Level 1 Gateway 252 to the ISCP 275. The ISCP 275 can also send signaling information, such as queries and control data, downstream through the same path to the DET 238. The network preferably utilizes standardized interfaces for signalling messages between LLGW 252 and ISCP 275 in order to remove both complex processing and difficult to maintain data from the system requirements of a network element.

This advantageously allows outgoing call screening based on real-time user input from a remote control. The service logic in the ISCP determines what instruction corresponds to the user response. The network preferably utilizes standardized interfaces for signalling messages between L1GW 252 and ISCP 275 in order to remove both complex processing and difficult to maintain data from the system requirements of a network element. While the interface prompting the called party for a response may vary by settop box, a standard message set is used for signalling the ISCP and the message sent to the ISCP must be in compliance with the standard message set.

The Integrated Services Control Point (ISCP) currently manages six standardized network interfaces: AIN 0.0, AIN 0.1, IS 41 Rev A, IS 41 Rev B, 1129+, and GDI. Three other network interfaces may be implemented soon: AIN 0.2, Core INAP, and IS 41 Rev C. These or other interfaces are used to allow various existing and future video network elements to connect to the ISCP in order to off-load a portion of their system's processing and data requirements and provide additional ISCP managed service functionality for both the end customer and Video Information Provider (VIP).

Figure 5:
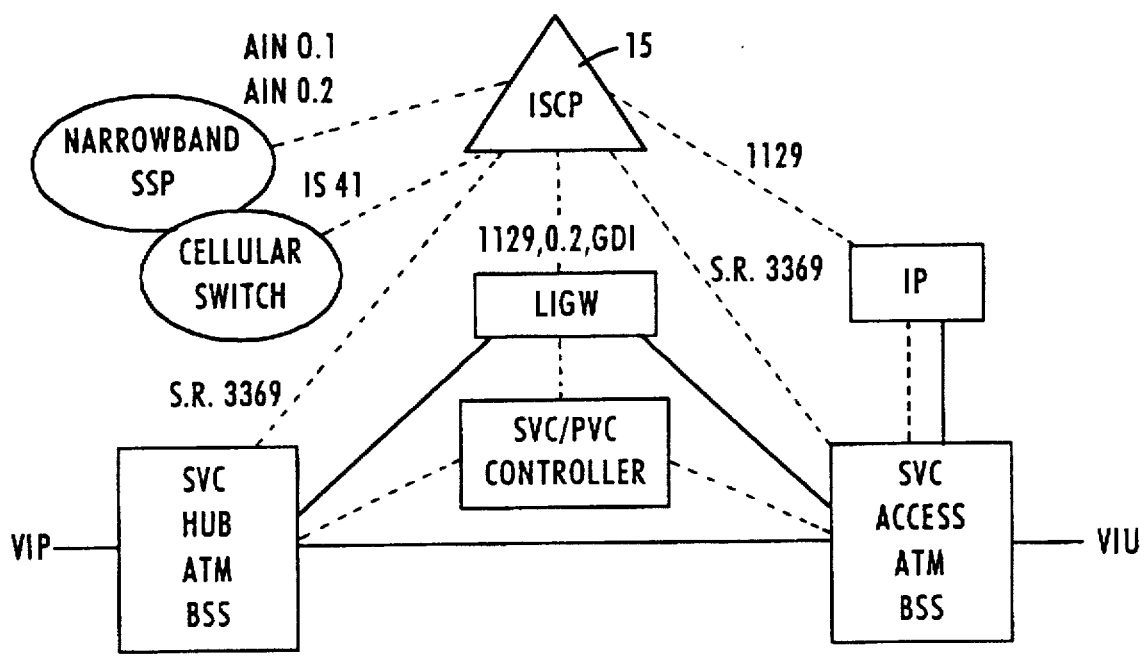
FIG. 5 is a block diagram showing various ISCP to broadband video network signaling interfaces.

FIG. 5 identifies various ISCP to video network signaling interfaces that might be available to different video components in order to provide different services. Most common are the AIN 0.1 and AIN 0.2 interfaces used to provide signalling between ISCP 15 and signal switching points of the narrowband public switched telephone network. The ISCP also supports an IS 41 interface to cellular switches, an 1129 interface to an intelligent peripheral and a S.R. 3369 interface to an ATM broadband switching system. The ISCP may interface with a SVC/PVC controller through a level 1 gateway using any one of the 1129, AIN 0.2 or GDI interfaces.

There are at least four different interface embodiments for video network element query access and interaction with the ISCP.

Figure 6:
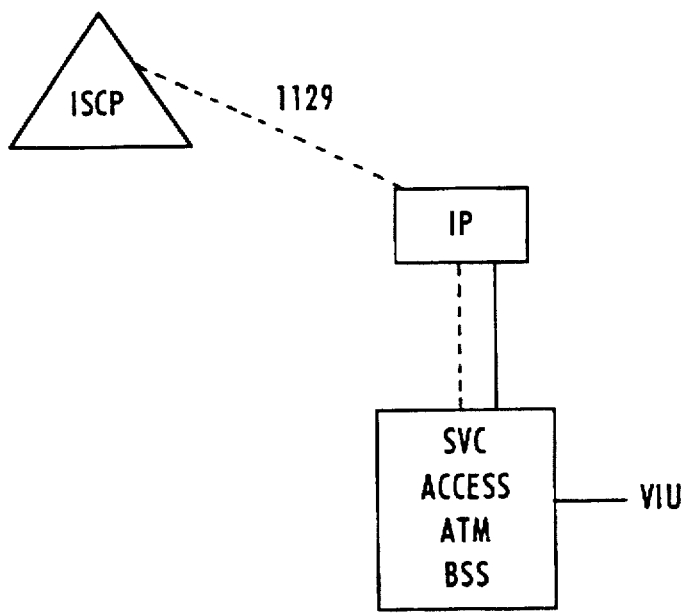
FIG. 6 is a block diagram showing a first ISCP to broadband video network signaling interface.

FIG. 6 illustrates the 1129+ Intelligent Peripheral (IP) Interface. In this embodiment, the broadband customer premises equipment connects directly to an Intelligent Peripheral (either prior to L1GW connection, or as a L2GW). Consequently, a VDT customer can use a remote control to directly interact with (and update) information residing on the ISCP or within an associated Operations Support System (OSS).

Figure 7:
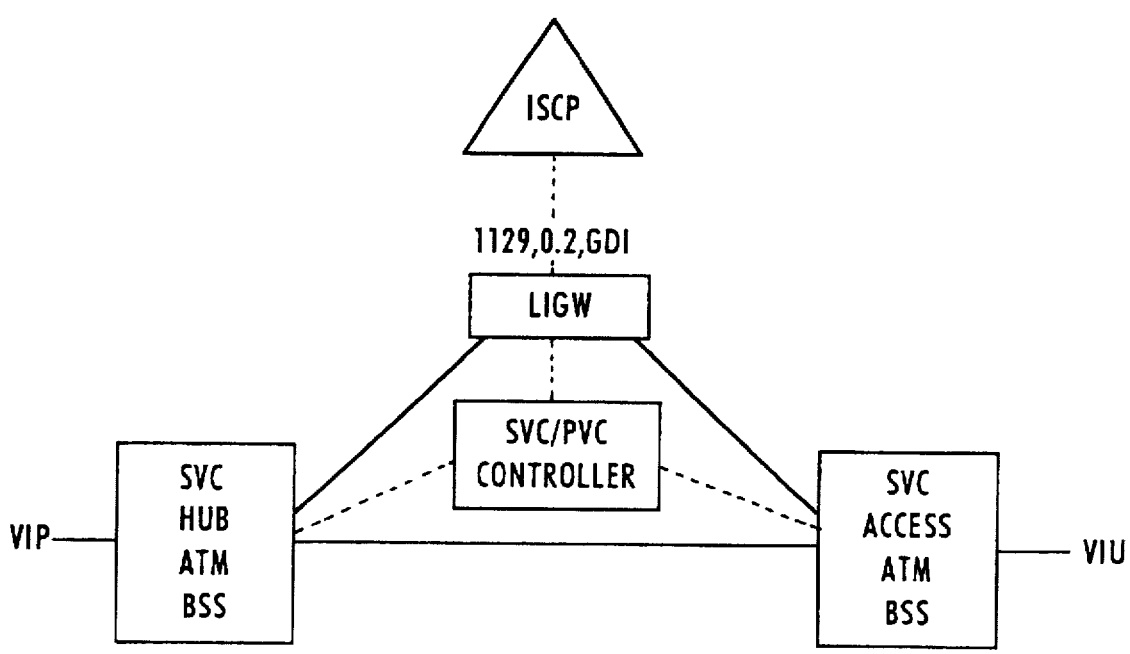
FIG. 7 is a block diagram showing a second ISCP to broadband video network signaling interface.

FIG. 7 shows a level 1 gateway (L1GW) which incorporates the capability to initiate an ISCP Query. The L1GW interacts with the customer and a variety of service information must be managed in order to successfully process the customer's transaction. Instead of creating the necessary process and data management functions on the L1GW, this embodiment has the L1GW query the ISCP. The ISCP then uses its existing capabilities to complete the transaction.

Figure 8:
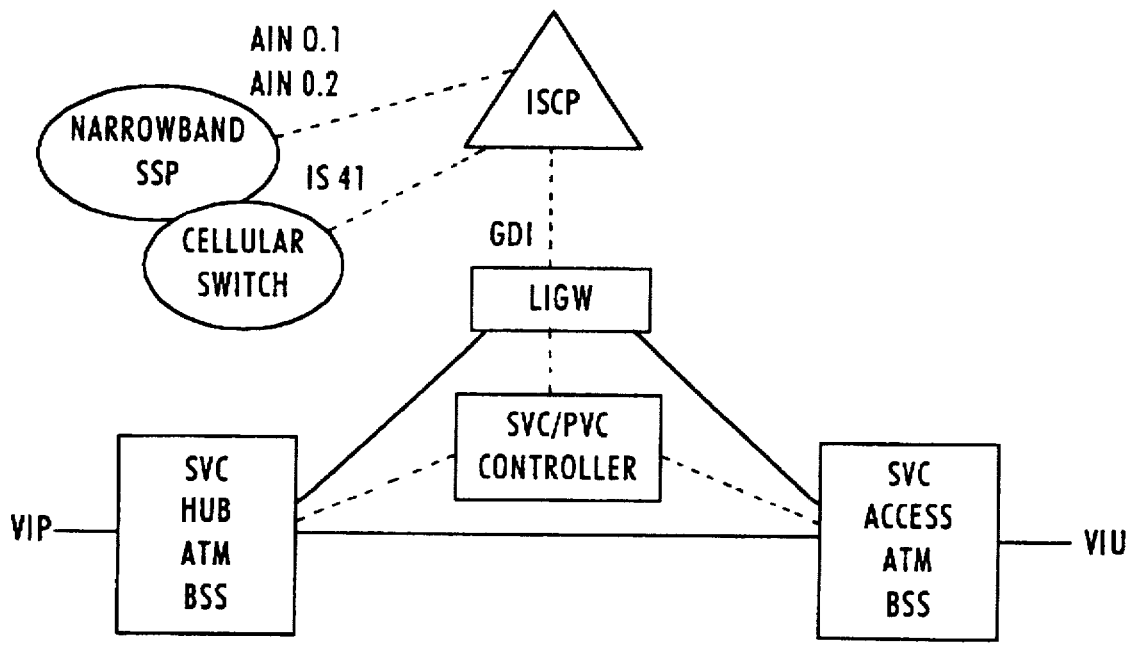
FIG. 8 is a block diagram showing a third ISCP to broadband video network signaling interface.

FIG. 8 shows the L1GW accepting ISCP initiated queries based on narrowband or cellular Activity. In this embodiment, video dial-tone services can be developed which are invoked based on traffic originating on the narrowband or cellular networks. Since narrowband and cellular switches are able to issue queries to the ISCP, subsequent queries must then originate from the ISCP and arrive at the L1GW. When a query reaches the L1GW, service delivery software code is then invoked to provide a value added service to the customer.

Figure 9:
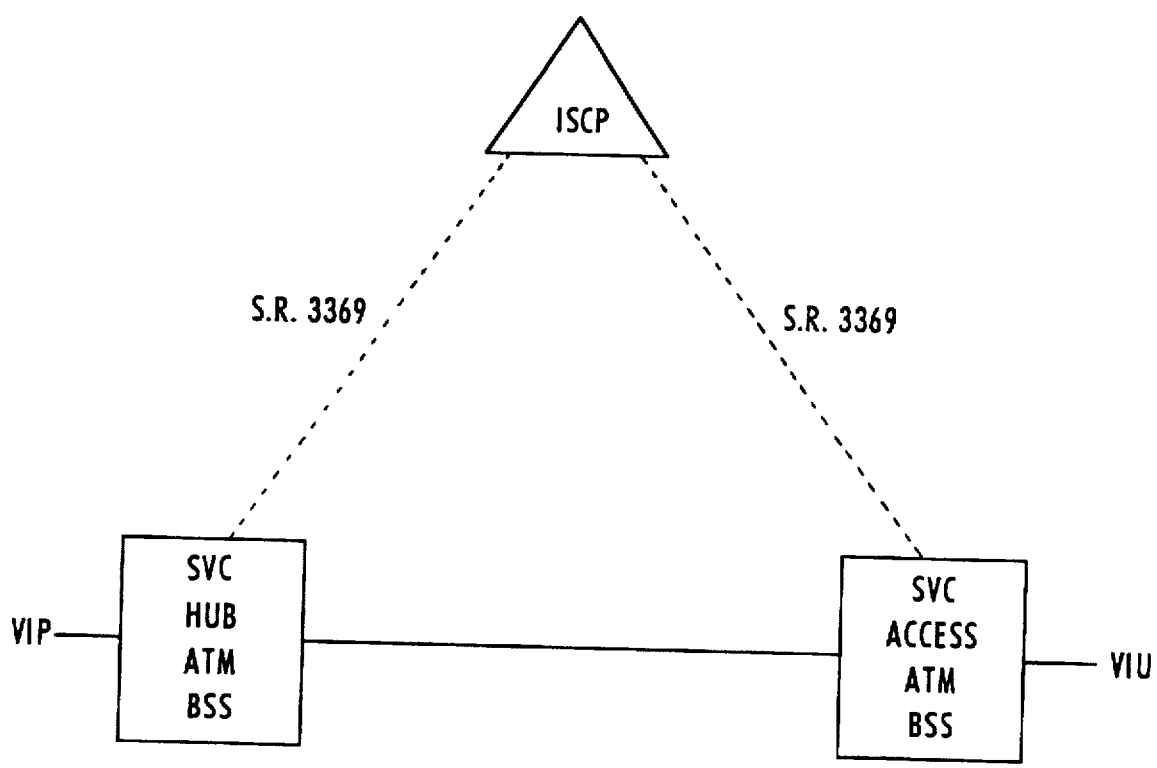
FIG. 9 is a block diagram showing a fourth ISCP to broadband video network signaling interface.

FIG. 9 shows an ATM Switch—Broadband Switching System (BSS) Interface which uses a standard AIN interface between the ATM switching fabric and the ISCP. The BBS interface may be the existing Bellcore defined interface known as S.R. 3369 (which closely matches the AIN 0.2 Interface specification) or any other present or future interface. The ISCP in such an environment could potentially provide direct person-to-person "video call" type services.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of screening an outgoing narrowband call through a narrowband network from a customer premises connected to a broadband network, said customer premises comprising broadband equipment connected to said broadband network and narrowband equipment connected to said narrowband network, the method comprising the steps of:

displaying broadband information received from said broadband network on said broadband equipment at said customer premises;

detecting the outgoing narrowband call from the customer's narrowband equipment, and dialed digits of said outgoing narrowband call, in a switch of the narrowband network;

responsive to said detecting in said switch, sending a query to a narrowband network services control point containing the dialed digits;

in response to said query to said services control point containing said dialed digits, initiating a data transaction to send data, including the dialed digits, from the services control point to the broadband network;

forwarding said data, including the dialed digits, through the broadband network to the broadband equipment at said customer premises; and in response to said data, including the dialed digits, being received at said broadband equipment at said customer premises, sending a message from the broadband equipment at said customer premises to the services control point indicating instructions for the connection of said outgoing narrowband call through the narrowband network.

2. The method according to claim 1, wherein said step of initiating a data transaction comprises sending a second query to the broadband network to determine whether said customer is receiving a video event.

3. The method according to claim 1, wherein said step of sending a query to the services control point comprises sending the query from the switch when the switch detects the outgoing narrowband call.

4. The method according to claim 3, wherein said services control point performs said step of initiating a data transaction.

5. The method according to claim 4, wherein said services control point performs said step of initiating a data transaction by sending a second query to an addressable settop box of said customer.

6. The method according to claim 5, wherein said services control point sends said data, including said dialed digits, to said addressable settop box when said settop box responds to said second query by indicating that the customer is receiving a video event.

7. The method according to claim 6, wherein said addressable settop box is responsive to said data, including said dialed digits, to display a message, receive a selection made by the customer on a remote control of said addressable settop box and send a message to the services control point indicating instructions corresponding to the selection made by the customer.

8. The method according to claim 6, wherein said method comprises the further step of sending a message from the services control point to the switch in the narrowband network after said settop box responds to said second query from the services control point by indicating that it is turned on.

9. The method according to claim 8, wherein said dialed digits are displayed before said narrowband call is connected.

10. The method according to claim 5, wherein said addressable settop box formats said data into a textual message and sends said textual message to the broadband equipment at said customer premises.

11. The method according to claim 10, wherein said addressable settop box overlays said textual message on video from said broadband network displayed on said broadband equipment at said customer premises.

12. The method according to claim 10, wherein said addressable settop box scrolls said textual message across the video displayed on the broadband equipment at said customer premises.

13. The method according to claim 1, wherein said step of detecting the outgoing narrowband call for the narrowband network comprises detecting a trigger event which causes the switch to send a query to the services control point in response to the detection of said outgoing telephone call.

14. The method according to claim 13, wherein said trigger event is an off hook delay trigger.

15. The method according to claim 1, wherein the switch formulates and sends signalling messages relating to the outgoing call, including a message containing the dialed digits, after the services control point instructs the switch to complete the call.

16. A communications network system having an advanced intelligent network controlling said system to provide narrowband and broadband communications to customer premises, said system comprising:

a narrowband network for narrowband communications having at least one signal switching office and a signal system, said at least one signal switching office routing narrowband calls and detecting an outgoing narrowband call from a customer at a customer premises and dialed digits corresponding to said outgoing narrowband;

a broadband network;

video equipment at said customer premises, including a video display, said video equipment connected to said broadband network via an addressable settop box;

a services control point, in said advanced intelligent network operative to perform network service logic programs for routing narrowband communications in said narrowband network, at least one of said network service logic programs being responsive to a query from said at least one signal switching office resulting from detecting said outgoing narrowband call including said dialed digits corresponding to said outgoing narrowband call, said at least one of said service logic programs instructing the services control point to initiate a data transaction to send data to said broadband network, said data including said dialed digits; and said addressable settop box, connected to said video equipment receiving broadband video information from said broadband network and said data including said dialed digits from said services control point, said video equipment displaying said data including said dialed digits and a prompt for the customer to enter a response, said settop box receiving said response and forwarding a message to said services control point indicative thereof, said services control point executing a service logic program in accordance with said message.

17. A communications system as recited in claim 16, wherein said service logic program executed in accordance with said message controls whether or not said outgoing narrowband call is completed through the narrowband network.

18. A communications system as recited in claim 17, wherein at least one of said network service logic programs contains instructions instructing the services control point to initiate the data transaction when detecting the dialed digits.

19. A communications system as recited in claim 16, wherein said services control point contains default service logic to be executed in the absence of a message from said settop box.

20. A communications system as recited in claim 19, wherein said network further comprises an interface point for interfacing said addressable settop box and said services control point.

21. A communications system as recited in claim 20, wherein said interface point comprises software resident in said addressable settop box.

22. A communications system as recited in claim 19, wherein said interface point comprises a level 1 gateway.

23. A communications system according to claim 22, wherein said services control point sends a message from the services control point to said at least one signal switching office in the narrowband network after said settop box forwards said message to the services control point indicating that the customer has entered a response.

24. A communications system according to claim 23, wherein said dialed digits and said prompt are displayed before said outgoing narrowband call progresses past said at least one signal switching point.

25. A communications system as recited in claim 19, wherein said addressable settop box formats said dialed digits into a textual message and wherein said prompt comprises a menu of options for completion of said outgoing narrowband call.

26. A communications system according to claim 25, wherein said menu of options contains an option for blocking said outgoing narrowband call.

27. A communications system according to claim 25, wherein said menu of options contains an option for completing said outgoing narrowband call.

28. A communications system according to claim 16, wherein said at least one signal switching point detects a trigger event on the narrowband call.

29. A communications system according to claim 28, wherein the trigger event comprises an originating trigger event.

30. A communications system according to claim 29, wherein said originating trigger event comprises an off hook delay trigger.

31. A communications system according to claim 30, wherein the video display comprises a television set.

32. A communications system as recited in claim 16, wherein said addressable settop box formats said dialed digits into a textual message and wherein said prompt comprises a menu of options for completion of said outgoing narrowband call.

33. A communications system according to claim 16, wherein said services control point sends a message from the services control point to said at least one signal switching office in the narrowband network after said settop box forwards said message to the services control point indicating that the customer has entered a response and wherein said dialed digits and said prompt are displayed before said outgoing narrowband call progresses past said at least one signal switching point.

* * * * *